United States Patent [19]
Christie et al.

[11] 4,090,909
[45] May 23, 1978

[54] TIRE BAND BUILDING DRUM

[75] Inventors: Christopher E. Christie, Akron, Ohio; Eddie B. Steffey, Danville, Va.

[73] Assignee: The Goodyear Tire & Rubber Company, Akron, Ohio

[21] Appl. No.: 716,327

[22] Filed: Aug. 20, 1976

[51] Int. Cl.² ............................................. B29H 17/14
[52] U.S. Cl. ..................................... 156/414; 29/235; 156/126; 156/289
[58] Field of Search ............... 156/123, 126, 133, 394, 156/414–420, 87, 285–287, 289, 408–413; 29/235

[56] References Cited
U.S. PATENT DOCUMENTS

| | | | |
|---|---|---|---|
| 1,643,202 | 9/1927 | Denmire | 156/394 |
| 1,732,931 | 10/1929 | Denmire | 156/414 |
| 2,416,523 | 2/1947 | Haren et al. | 156/418 |
| 2,699,198 | 1/1955 | Balzhiser | 156/417 |
| 2,871,912 | 2/1959 | Kraft | 29/235 X |
| 3,027,289 | 3/1962 | Gitzinger | 156/123 |
| 3,503,829 | 3/1970 | Menell et al. | 156/133 |
| 3,900,941 | 8/1975 | Browning et al. | 29/235 |

Primary Examiner—David Klein
Assistant Examiner—John E. Kittle
Attorney, Agent, or Firm—R. S. Washburn

[57] ABSTRACT

A rigid fixed diameter cylindrical drum for building a tire band, i.e., a straight cylindrical ply assembly without bead rings or other circumferentially inextensible elements subsequently to be a part of a complete tire, is enabled to release the band built thereon for coaxial movement of the cylindrical band off the drum. The cylindrical surface of the drum is knurled in a coarse diamond-toothed pattern. Perforations or orifices for air pressure and flow are also provided. The foregoing abstract is not to be taken as limiting the invention of this application, and in order to understand the full nature and extent of the technical disclosure of this application, reference must be made to the accompanying drawing and the following detailed description.

3 Claims, 3 Drawing Figures

TIRE BAND BUILDING DRUM

The invention relates to tire building and particularly to a tire band building drum for building a cylindrical circumferentially expandable band subsequently to be incorporated in a vehicle tire.

Broadly, the invention provides a tire band building drum for building a cylindrical circumferentially expandable band subsequently to be incorporated in a vehicle tire, the drum comprising a rigid integral cylindrical member having an axially and circumferentially continuous building surface terminating at the axial ends of the member, means for mounting said member for rotation about the axis of said drum, said surface being knurled in a coarse diamond knurl pattern.

A preferred embodiment of the invention is described herein by and with reference to the attached drawings in which.

Figure 1:
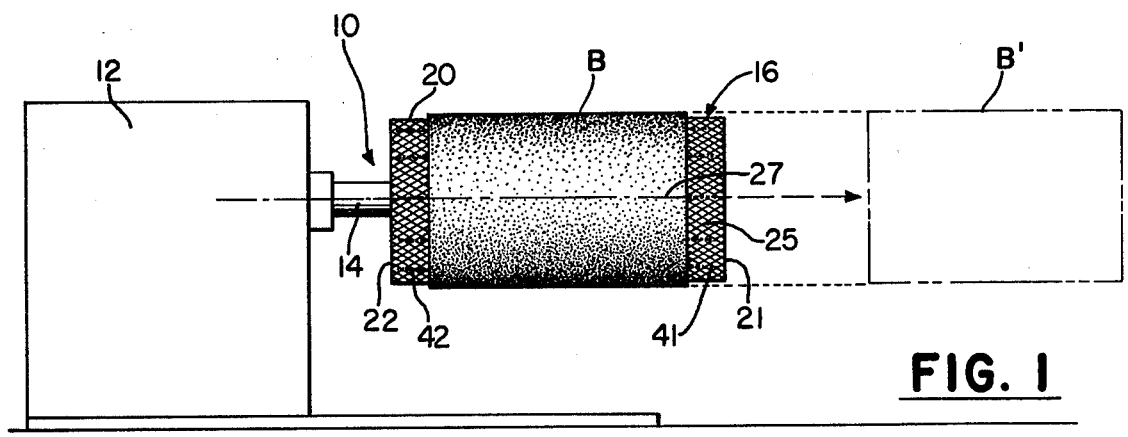
FIG. 1 is an elevation view of a tire band building machine in accordance with the invention.

The tire band building machine 10, FIG. 1, includes conventional building machine housing 12 having a spindle 14 extended horizontally outwardly of the housing to support and to rotate the band building drum 16. The band B built or assembled on the drum 16 comprises a sheet or sheets of tire building stock, each wrapped about the drum and spliced to form an endless circumferentially expandable cylindrical band subsequently to be incorporated in a vehicle tire. The term "band" as used herein will be understood to mean a tire building component in straight cylindrical form free of inextensible bead rings and other inextensible elements of the ultimate tire.

The band B, when completed on the drum 16, can be removed axially from the drum 16 without requiring that the drum be collapsed or otherwise reduced in diameter. The so removed band is designated B' in FIG. 1, and there is no significant change in its diameter or shape during its removal from the drum.

Figure 2:
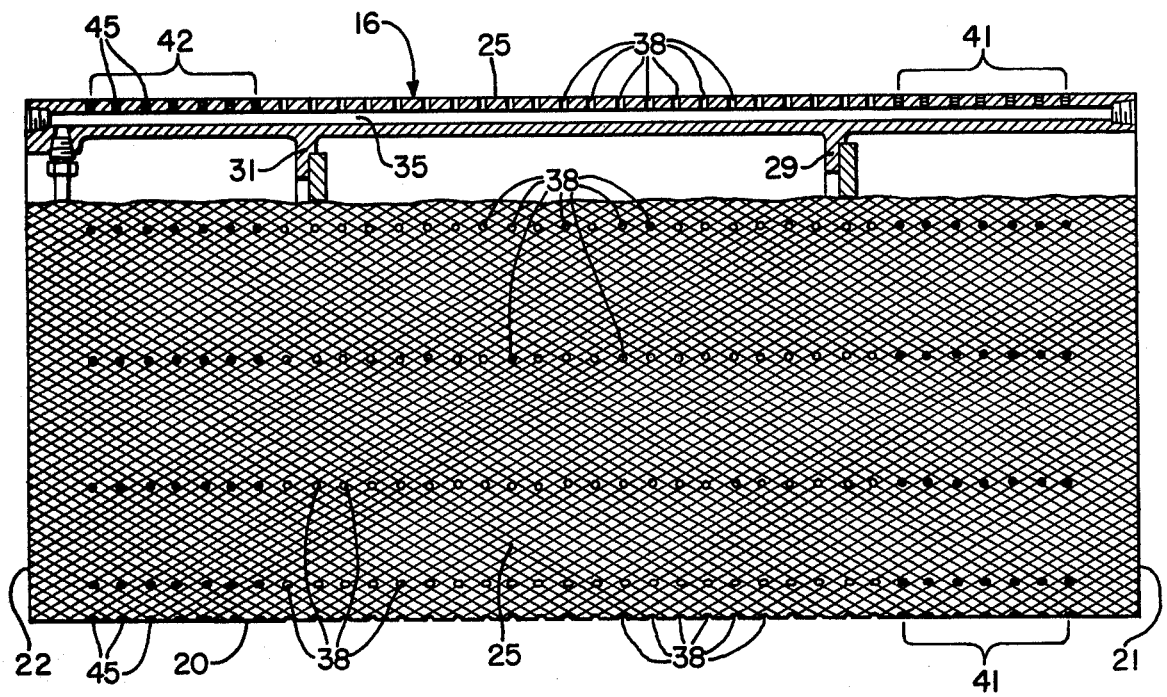
FIG. 2 is an enlarged elevation view partially in section illustrating the band building drum of FIG. 1.

The drum 16 is illustrated in FIG. 2 and includes a rigid cylindrical member 20 having an axially and circumferentially continuous building surface 25 which terminates at the respective axial ends 21 and 22 of the member. As can be seen from the drawings, the building surface 25 is disposed concentrically of and faces radially outwardly of the longitudinal axis of the drum.

Means for mounting the member 20 for rotation about the axis 27 of the drum are provided by the annular flanges 29 and 31 which extend radially inward of the wall of the drum.

The respective flanges are attached corotatably in a convenient manner (not shown) to the spindle 14.

The building surface 25 of the member 20 is knurled in a coarse diamond knurl pattern having a nominal pitch of 13 crests or peaks per inch.

Surprisingly, the knurled pattern has been found not only to resist the tendency of the band built on the drum to move, circumferentially of the drum, under the influence of conventional stitching, but also to facilitate the removal of the completed band axially from the drum. This is clearly contrary to a normal expectation of anyone skilled in the art. Without being restricted to any particular theoretical explanation, the surprising effect of the knurling, in facilitating the axial removal of the band, may be that the multitude of grooves provided by the diamond knurl pattern allow a flow of air sufficient slightly to raise and to "lubricate" or "float" the band from the drum.

The member 20 is preferably an integral casting of, for example, aluminum or suitable alloy of aluminum, having a plurality of passages 35 formed therein parallel to the axis 27 of the member. The surface 25 is provided with a multiplicity of airflow orifices 38 to apply air pressure inward and outward of the member 20. The orifices are arranged in rows parallel to the axis, each row being in the axial plane of the associated passage 35. The passages 35 provide means connecting the orifices 38 to means (not shown) for effecting air pressure selectively above and below atmospheric pressure, in said orifices. Means for effecting air pressure will be understood to include means for applying super-atmospheric air pressure outward and means for effecting a suction, sub-atmospheric, or inward pressure at the respective orifices. As will be apparent from the drawings, the orifices 38 open outwardly of the external surface 25 of the member 20.

To accommodate different widths, that is, axial lengths of tire bands to be built on the drum, selected groups 41,42 of orifices extend inwardly from the respective ends 21 and 22 of the member. The selected groups 41,42 include those orifices disposed between an edge of the band B and the respectively adjacent end 21,22 of the member 20. Means for closing the orifices are conveniently provided by headless screws 45 disposed radially beneath the surface 25, the associated orifices being correspondingly tapped to accommodate the screws. A selected group of orifices will be understood to mean a corresponding number of orifices in each of the rows thereof extending axially inwardly from the associated end of the member so that an axially extending width of the surface 25 corresponding to the width of a band to be built on the drum is provided with active orifices and the axial extent of the drum outwardly of such band has the orifices therein closed to flow or pressure of air therein.

Figure 3:
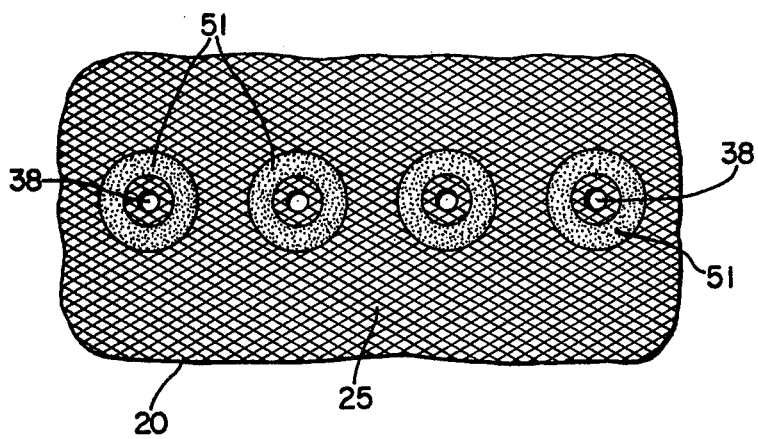
FIG. 3 is an enlarged detail view of a feature of the tire band building drum of FIG. 1.

A further feature of the drum 16 is the provision of an annular dam 51 surrounding each of the orifices 38. The dam is provided by any suitable hardenable material such as Devcon F, a material supplied by Devcon Corporation of Danvers, Mass. The hardenable material is applied around each orifice to fill the knurl pattern about the orifice and is struck off flush with the crests of the pattern of diamond knurling. Each orifice 38 in the member 20 is about 0.1 inch (2½ mm.) in diameter. The annular dam 51 surrounding each orifice is about 0.31 inch (8 mm.) inside diameter and 0.62 inch (16 mm.) outside diameter. The dams are formed by hand and may vary both in dimensions and shape from the dams 51 shown in FIG. 3, without harmful effect.

The effect of the dams is to increase the suction area around each of the holes to increase the suction effect applied to the innermost ply of the band. By increasing the area about the orifices, wrinkling and shifting of the band while the same is being stitched to consolidate the plies of the band is reduced or avoided. The suction effect can also assist in properly placing the first of the plies of the band.

To remove the band B from the drum, super-atmospheric pressure is introduced in the passages 35 and orifices 38. The air pressure causes a flow of air which readily passes between the inmost ply of the band and the dams 51 and flows in the multiplicity of grooves formed by the knurling to facilitate the removal of the band coaxially from the drum.

The axial length of the member 20 is greater than the axial length of any tire band built thereon and, in particular, the diameter of the building surface 25 can be greater or less than the bead diameter of the tire in which the band is incorporated.

While certain representative embodiments and details have been shown for the purpose of illustrating the invention, it will be apparent to those skilled in the art that various changes and modifications may be made therein without departing from the spirit or scope of the invention.

What is claimed is:

1. A tire band building machine including a non-collapsible, cylindrical band building drum; means mounting said drum for rotation about its longitudinal axis; said drum comprising a rigid cylindrical member having an external cylindrical surface of fixed diameter disposed concentrically of and facing radially outwardly of said axis to provide a band building surface upon which a sheet of tire building stock may be wrapped and stitched to provide a tire band; said drum being provided with means for supplying air at super-atmospheric pressure between said band building surface and a tire band which has been built thereon including a plurality of orifices provided in said member and opening outwardly of said band building surface; and means for facilitating removal from said drum, and in a direction axially of the drum, of a tire band wrapped about and stitched on said drum, where said removal is accomplished in part by the supply of air at super-atmospheric pressure outwardly through said orifices, said last-mentioned means consisting of said building surface being provided with a coarse diamond knurling.

2. A tire band building machine as described in claim 1, including means for applying suction to a sheet of tire building stock in contact with said building surface, said means for applying suction including said orifices in said member and dam means on said member for increasing the suction effect during the application of sub-atmospheric air pressure to said orifices, said knurling being provided on said member over substantially the entire extent of said building surface other than the locations occupied by said orifices and dam means.

3. A tire band building machine as described in claim 1, wherein said dam means comprises a plurality of dams on said member and surrounding said orifices, each dam extending radially outwardly of said member a distance equal to the height of the peaks or crests of said knurling.

* * * * *